United States Patent
Choi et al.

(10) Patent No.: US 12,469,879 B2
(45) Date of Patent: Nov. 11, 2025

(54) ELECTROLYTE ADDITIVE, BATTERY ELECTROLYTE INCLUDING ELECTROLYTE ADDITIVE, AND SECONDARY BATTERY INCLUDING BATTERY ELECTROLYTE

(71) Applicant: SOULBRAIN CO., LTD., Gyeonggi-do (KR)

(72) Inventors: Ji Young Choi, Gyeonggi-do (KR); Ji Seong Han, Gyeonggi-do (KR); Jong Chul Yun, Gyeonggi-do (KR); Min Goo Kim, Gyeonggi-do (KR); Min Jung Jang, Gyeonggi-do (KR); Hyeong Kyu Lim, Gyeonggi-do (KR); Wan Chul Kang, Gyeonggi-do (KR); Sang Ho Lee, Gyeonggi-do (KR)

(73) Assignee: SOULBRAIN CO., LTD., Gyeonggi-do (KR)

( * ) Notice: Subject to any disclaimer, the term of this patent is extended or adjusted under 35 U.S.C. 154(b) by 838 days.

(21) Appl. No.: 17/621,293

(22) PCT Filed: Jun. 26, 2020

(86) PCT No.: PCT/KR2020/008418
§ 371 (c)(1),
(2) Date: Dec. 21, 2021

(87) PCT Pub. No.: WO2020/263045
PCT Pub. Date: Dec. 30, 2020

(65) Prior Publication Data
US 2022/0376299 A1  Nov. 24, 2022

(30) Foreign Application Priority Data

Jun. 28, 2019  (KR) .................. 10-2019-0078036
Nov. 1, 2019   (KR) .................. 10-2019-0138280
Jun. 26, 2020  (KR) .................. 10-2020-0078727

(51) Int. Cl.
| | |
|---|---|
| *H01M 50/46* | (2021.01) |
| *H01M 10/0525* | (2010.01) |
| *H01M 10/0567* | (2010.01) |
| *H01M 10/0568* | (2010.01) |
| *H01M 10/0569* | (2010.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 50/46* (2021.01); *H01M 2220/20* (2013.01); *H01M 2300/0028* (2013.01)

(58) Field of Classification Search
CPC ............ H01M 10/0567; H01M 50/46; H01M 10/0525; H01M 10/0568; H01M 10/0569; H01M 2220/20; H01M 2300/0028
See application file for complete search history.

(56) References Cited

U.S. PATENT DOCUMENTS

| | | | |
|---|---|---|---|
| 2006/0172201 A1* | 8/2006 | Yasukawa ............. | H01M 4/133 429/329 |
| 2013/0004840 A1* | 1/2013 | Yu ........................... | C07F 9/145 429/188 |
| 2014/0045016 A1* | 2/2014 | Okutani ............... | H01M 50/119 429/185 |
| 2016/0020467 A1* | 1/2016 | Sugita ................... | H01M 4/366 429/209 |
| 2018/0076463 A1* | 3/2018 | Sugita ................... | H01M 4/628 |

FOREIGN PATENT DOCUMENTS

| | | | |
|---|---|---|---|
| CN | 103972586 A | | 8/2014 |
| CN | 109705390 | * | 5/2019 |
| EP | 1357628 A | | 10/2003 |
| JP | 2008300126 A | | 12/2008 |
| JP | 2014225410 A | | 12/2014 |
| JP | 2016018708 A | | 2/2016 |
| KR | 20130003649 A | | 1/2013 |
| KR | 20150128569 A | | 11/2015 |
| KR | 101586199 B1 | | 1/2016 |
| KR | 20160063905 A | | 6/2016 |
| KR | 20180050781 A | | 5/2018 |

OTHER PUBLICATIONS

CN109705390 MT (Year: 2019).*

* cited by examiner

Primary Examiner — Alexander Usyatinsky
(74) Attorney, Agent, or Firm — SZDC Law PC

(57) ABSTRACT

The present invention relates to an electrolyte additive, a battery electrolyte including the electrolyte additive, and a secondary battery, and more particularly, to an electrolyte additive including a compound represented by Chemical Formula 1, an electrolyte including the electrolyte additive, and a secondary battery including the electrolyte. According to the present invention, due to low charging resistance, charging efficiency and output may be improved. In addition, the present invention has an effect of providing a secondary battery having a long lifespan and excellent capacity retention at high temperature.

13 Claims, No Drawings

ELECTROLYTE ADDITIVE, BATTERY ELECTROLYTE INCLUDING ELECTROLYTE ADDITIVE, AND SECONDARY BATTERY INCLUDING BATTERY ELECTROLYTE

This application is the National Stage Application of PCT/KR2020/008418 filed on Jun. 26, 2020, which claims priority to Korean Patent Application Nos. KR 10-2019-0078036, filed on Jun. 28, 2019, KR 10-2019-0138280, filed on Nov. 1, 2019, and KR 10-2020-0078727, filed on Jun. 26, 2020, all of which are incorporated by reference for all purposes as if fully set forth herein.

TECHNICAL FIELD

The present invention relates to an electrolyte additive, a battery electrolyte including the electrolyte additive, and a secondary battery including the battery electrolyte, and more particularly, to an electrolyte additive that may improve the charging efficiency and output of a battery, enables long-term storage, and may increase capacity retention at high temperature.

BACKGROUND ART

In a lithium secondary battery, an electrolyte between a cathode and an anode enables smooth movement of lithium ions. In addition, since electricity is generated or consumed by oxidation-reduction reaction dependent on insertion and desorption at a cathode and an anode, electrical energy may be easily used.

In addition, as environmental regulations are tightened around the world and interest in the environment is growing, interest in eco-friendly vehicles that can replace vehicles using fossil fuel, which is one of the main causes of air pollution, is increasing. Accordingly, in the domestic/foreign battery industries, development of batteries for vehicles is being actively carried out.

To apply a battery to a vehicle, the output and capacity of the battery must be significantly increased. In addition, problems of reduced output and increased resistance at high and low temperatures according to use environments such as weather changes have to be solved. In addition, considering that vehicles are used outdoors regardless of season, it is required to develop a battery having a short charging time and excellent capacity retention in various environments.

RELATED ART DOCUMENTS

Patent Documents

JP 2008-300126 A
KR 10-1586199 B1

DISCLOSURE

Technical Problem

Therefore, the present invention has been made in view of the above problems, and it is one object of the present invention to provide a novel electrolyte additive for batteries, a battery electrolyte including the electrolyte additive, and a secondary battery including the battery electrolyte.

It is another object of the present invention to provide a secondary battery having improved battery output due to reduction in charging resistance, capable of long-term storage due to improved recovery capacity at high temperature, and having excellent lifespan retention at high temperature.

The above and other objects can be accomplished by the present invention described below.

Technical Solution

In accordance with one aspect of the present invention, provided is an electrolyte additive including a compound represented by Chemical Formula 1 below:

[Chemical Formula 1]

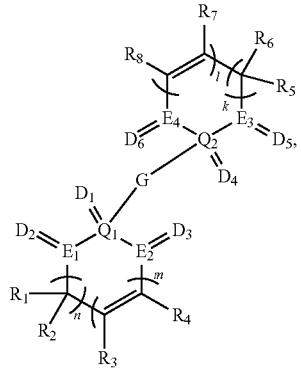

wherein G is —O—, —OR$_a$—, —N(R$_b$)— or —R$_c$—N(R$_d$)—R$_e$—, —R$_f$(NR$_g$R$_h$)—, or —R$_i$—; R$_a$, R$_c$, R$_e$, R$_f$, and R$_i$ are each independently a linear or branched alkylene group having 1 to 10 carbon atoms; R$_b$, R$_d$, R$_g$, and R$_h$ are each independently hydrogen or a linear or branched alkyl group having 1 to 10 carbon atoms; Q$_1$ and Q$_2$ are each independently phosphorus (P), sulfur (S), or arsenic (As); D$_1$, D$_2$, D$_3$, D$_4$, D$_5$, and D$_6$ are each independently oxygen (═O) or one or two unshared electron pairs; E$_1$, E$_2$, E$_3$, or E$_4$ is oxygen or carbon; when D$_2$, D$_3$, D$_5$, or D$_6$ is oxygen, E$_1$, E$_2$, E$_3$, or E$_4$ bonded thereto is carbon; R$_1$, R$_2$, R$_3$, R$_4$, R$_5$, R$_6$, R$_7$, and R$_8$ are each independently hydrogen, a linear or branched alkyl group having 1 to 10 carbon atoms, an alkenyl group, an alkynyl group, an alkoxy group, an alkoxycarbonyl group, or an alkoxyalkyl group; optionally, R$_3$ and R$_4$ or R$_7$ and R$_8$ are bonded to form a ring; n and k are each independently an integer of 0 to 5; m and l are each independently 0 or 1; and at least one of n and m and at least one of k and l are not 0.

In accordance with another aspect of the present invention, provided is an electrolyte for batteries including the electrolyte additive and a secondary battery including the electrolyte.

Advantageous Effects

A secondary battery including an electrolyte additive according to the present invention has improved charging efficiency and output due to low charging resistance, and has a long lifespan and excellent capacity retention at high temperature.

Best Mode

Hereinafter, the present invention will be described in detail, but the present invention is not limited thereto.

To manufacture a battery usable as a vehicle battery, the present inventors have conducted research on a secondary battery having improved output and excellent recovery capacity and lifespan characteristics at high temperature. In the course of research, the present inventors confirmed that, when an additive having a specific structure was added to the electrolyte of a secondary battery, all of the above objects were achieved. Based on these results, the present inventors conducted further studies to complete the present invention.

An electrolyte additive for batteries according to embodiments of the present invention includes a compound represented by Chemical Formula 1 below. In this case, charging efficiency and output may be improved due to decrease in the charging resistance of a secondary battery, a lifespan may increase, and capacity retention at high temperature may be excellent.

[Chemical Formula 1]

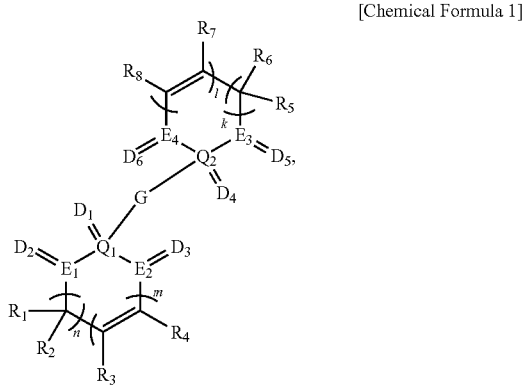

wherein G is —O—, —$OR_a$—, —$N(R_b)$— or —$R_c$—N($R_d$)—$R_e$—, —$R_f(NR_gR_h)$—, or —$R_i$—; $R_a$, $R_c$, $R_e$, $R_f$, and $R_i$ are each independently a linear or branched alkylene group having 1 to 10 carbon atoms; $R_b$, $R_d$, $R_g$, and $R_h$ are each independently hydrogen or a linear or branched alkyl group having 1 to 10 carbon atoms; $Q_1$ and $Q_2$ are each independently phosphorus (P), sulfur (S), or arsenic (As); $D_1$, $D_2$, $D_3$, $D_4$, $D_5$, and $D_6$ are each independently oxygen (═O) or one or two unshared electron pairs; $E_1$, $E_2$, $E_3$, or $E_4$ is oxygen or carbon; when $D_2$, $D_3$, $D_5$, or $D_6$ is oxygen, $E_1$, $E_2$, $E_3$, or $E_4$ bonded thereto is carbon; $R_1$, $R_2$, $R_3$, $R_4$, $R_5$, $R_6$, $R_7$, and $R_8$ are each independently hydrogen, a linear or branched alkyl group having 1 to 10 carbon atoms, an alkenyl group, an alkynyl group, an alkoxy group, an alkoxycarbonyl group, or an alkoxyalkyl group; optionally, $R_3$ and $R_4$ or $R_7$ and $R_8$ are bonded to form a ring; n and k are each independently an integer of 0 to 5; m and l are each independently 0 or 1; and at least one of n and m and at least one of k and l are not 0.

When n, k, m, or l is 0, a corresponding unit, i.e., a group in parentheses, disappears and means a bond. For example, when n, which is the number of a corresponding unit, is 0, and m, which is the number of a corresponding unit, is 1, $E_1$ is a compound directly bonded to a carbon double bond in which $R_3$ is substituted.

In this description, the alkylene group means a divalent hydrocarbon group. As a specific example, a propylene group refers to —$CH_2CH_2CH_2$— or —$CH_2CH(CH_3)$—. Here, divalent means that there are two bonding sites.

In this description, the alkenyl group means a monovalent hydrocarbon group including a carbon-carbon double bond. As a specific example, an n-butenyl group refers to $CH_2$═$CHCH_2CH_2$—.

In this description, the alkynyl group means a monovalent hydrocarbon group including a carbon-carbon triple bond. As a specific example, a 1-butynyl group refers to $CHCCH_2CH_2$—.

Preferably, $R_a$, $R_c$, $R_e$, $R_f$, and $R_i$ are each independently a linear or branched alkylene group having 1 to 3 carbon atoms. In this case, charging efficiency and output may be improved due to decrease in the charging resistance of a secondary battery, a lifespan may increase, and capacity retention at high temperature may be excellent.

Preferably, $R_b$, $R_d$, $R_g$, and $R_h$ are each independently hydrogen or a linear alkyl group having 1 to 3 carbon atoms. In this case, charging efficiency and output may be improved due to decrease in the charging resistance of a secondary battery, a lifespan may increase, and capacity retention at high temperature may be excellent.

Preferably, $Q_1$ and Q2 are each independently phosphorus (P). In this case, charging efficiency and output may be improved due to decrease in the charging resistance of a secondary battery, a lifespan may increase, and capacity retention at high temperature may be excellent.

Preferably, $R_1$, $R_2$, $R_3$, $R_4$, $R_5$, $R_6$, $R_7$, and $R_8$ are each independently hydrogen, a linear or branched alkyl group having 1 to 5 carbon atoms, an alkenyl group, an alkynyl group, an alkoxy group, an alkoxycarbonyl group, or an alkoxyalkyl group. More preferably, $R_1$, $R_2$, $R_3$, $R_4$, $R_5$, $R_6$, $R_7$, and $R_8$ are each independently hydrogen, a linear or branched alkyl group having 1 to 3 carbon atoms, an alkenyl group, an alkynyl group, an alkoxy group, an alkoxycarbonyl group, or an alkoxyalkyl group. In this case, charging efficiency and output may be improved due to decrease in the charging resistance of a secondary battery, a lifespan may increase, and capacity retention at high temperature may be excellent.

Preferably, $R_3$ and $R_4$ or $R_7$ and $R_8$ are bonded to form an aromatic ring, more preferably a benzene ring. In this case, charging efficiency and output may be improved due to decrease in the charging resistance of a secondary battery, a lifespan may increase, and capacity retention at high temperature may be excellent. Here, the benzene ring is shown in Chemical Formula 5 below.

Preferably, n and k are each independently an integer of 0 to 3, more preferably an integer of 1 to 3, still more preferably 2 or 3. In this case, charging efficiency and output may be improved due to decrease in the charging resistance of a secondary battery, a lifespan may increase, and capacity retention at high temperature may be excellent.

Preferably, m and l are each independently 1. In this case, charging efficiency and output may be improved due to decrease in the charging resistance of a secondary battery, a lifespan may increase, and capacity retention at high temperature may be excellent.

Preferably, the compound represented by Chemical Formula 1 is symmetric with respect to G. In this case, since the compound has a symmetrical cyclic structure, electron flow in the molecule is stabilized, and thus molecular rigidity is increased, thereby greatly improving battery performance.

Preferably, the compound represented by Chemical Formula 1 includes one or more selected from the group consisting of compounds represented by Chemical Formulas 2 to below, more preferably compounds represented by Chemical Formulas 16 to 25 below. In this case, since a secondary battery has a low charging resistance, the charging efficiency and output of the secondary battery may be improved. In addition, a secondary battery may have a long lifespan and excellent capacity retention at high temperature.

[Chemical Formula 2]

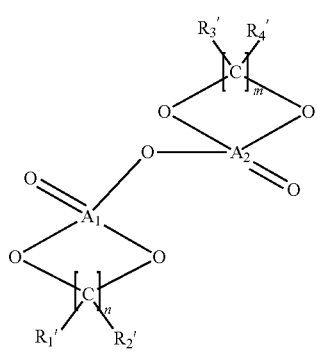

(In Chemical Formula 2, $A_1$ and $A_2$ are each independently phosphorus or sulfur, $R_1'$, $R_2'$, $R_3'$, and $R_4'$ are each independently hydrogen or a substituted or unsubstituted alkyl group having 1 to 10 carbon atoms, and m and n are each independently an integer of 1 to 5.) Here, O and C are oxygen and carbon, respectively.

[Chemical Formula 3]

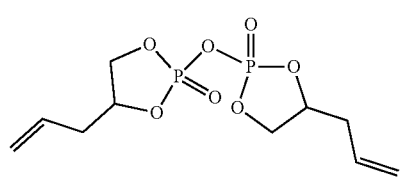

[Chemical Formula 4]

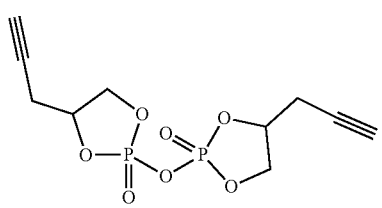

[Chemical Formula 5]

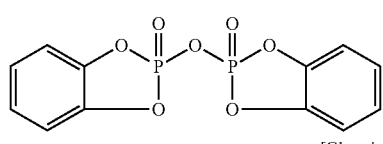

[Chemical Formula 6]

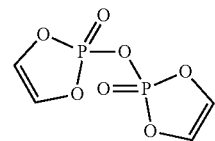

[Chemical Formula 7]

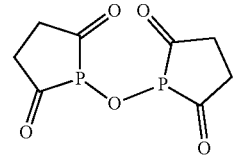

[Chemical Formula 8]

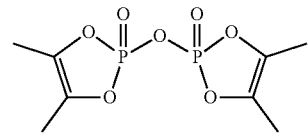

[Chemical Formula 9]

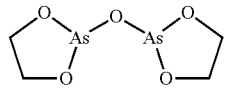

[Chemical Formula 10]

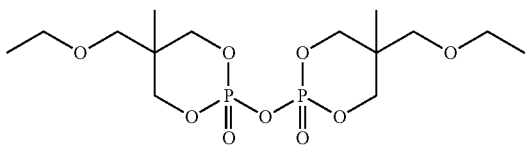

[Chemical Formula 11]

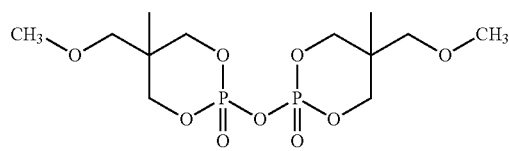

[Chemical Formula 12]

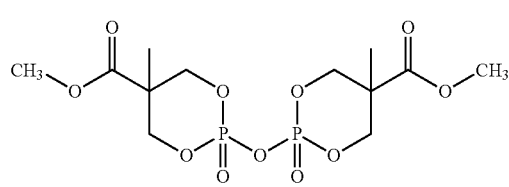

[Chemical Formula 13]

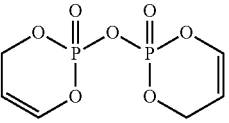

[Chemical Formula 14]

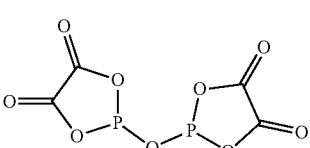

[Chemical Formula 15]

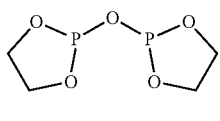

[Chemical Formula 16]

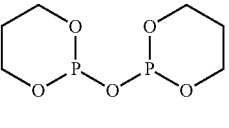

[Chemical Formula 17]

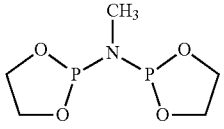

[Chemical Formula 18]

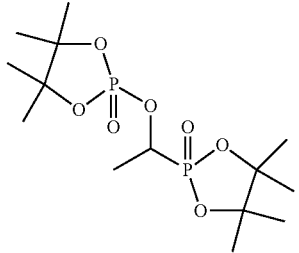

[Chemical Formula 19]

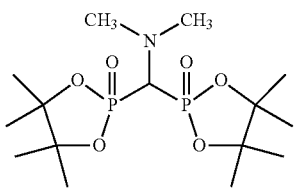

[Chemical Formula 20]

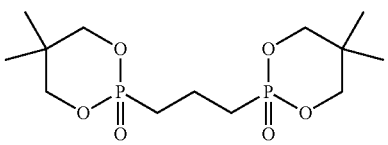

[Chemical Formula 21]

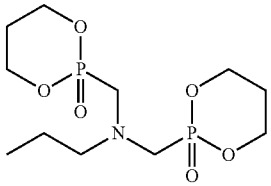

[Chemical Formula 22]

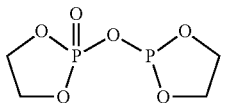

[Chemical Formula 23]

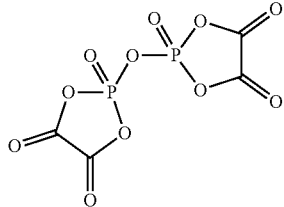

[Chemical Formula 24]

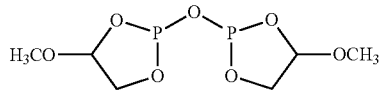

[Chemical Formula 25]

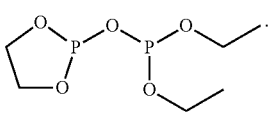

(In Chemical Formulas 3 to 25, a line denotes a bond, carbon is located at a point where bonds meet without a separate element being marked, and the number of hydrogens satisfying the valence of the carbon is omitted)

In Chemical Formula 2, $A_1$ and $A_2$ are each independently phosphorus or sulfur, $R_1'$, $R_2'$, $R_3'$, and $R_4'$ are each independently hydrogen or a substituted or unsubstituted alkyl group having 1 to 10 carbon atoms, and m and n are each independently an integer of 1 to 5.

When the electrolyte additive represented by Chemical Formula 2 is added to the electrolyte of a secondary battery, electrons are localized towards the element O due to the electronegativity difference between the element P or S and the directly connected element O. As a result, the element P or S becomes an electron deficient state (e− poor, δ+), oxidation reaction is induced in the electrolyte containing lithium ions, and a stable film is formed on an electrode, specifically, a cathode. In this case, decomposition of the electrolyte may be prevented due to the stable film, and thus cycle characteristics may be improved. In particular, since the film is not decomposed at high temperature, storage properties at high temperature may be greatly improved compared to conventional electrode films that are decomposed at high temperature and have poor storage properties at high temperature. In addition, since increase in resistance is prevented, charging efficiency and output may be improved. In addition, since gas generation due to chemical reaction inside a battery is suppressed, battery safety may be improved. In addition, since the structures of the electrode active materials of a cathode and an anode are prevented from collapsing at high temperature, capacity retention may be improved, and thus lifespan may be increased.

In Chemical Formula 2, $A_1$ and $A_2$ are each independently phosphorus or sulfur. From the viewpoint of the above-described effects, phosphorus with a large difference in electronegativity from the element O is more preferable.

R1', R2', R3', and R4' may each independently be hydrogen or a substituted or unsubstituted alkyl group having 1 to 10 carbon atoms, preferably hydrogen or a methyl group, more preferably hydrogen.

m and n may each independently be an integer of 1 to 5, preferably an integer of 1 to 3, more preferably 1 or 2. When R1', R2', R3', and R4' are each hydrogen, and m and n are each 1 or 2, stability may be improved by simplifying a molecular structure.

In Chemical Formula 2, $A_1$ and $A_2$ and m and n may each independently be the same or different from each other. When $A_1$ and $A_2$ are the same elements, and "m=n" is satisfied so that the chemical structure of the electrolyte additive compound is symmetrical, since the compound has a symmetrical cyclic structure, electron flow in the molecule is stabilized, and thus molecular rigidity is increased, thereby greatly improving battery performance. However, the present invention is not limited thereto, and even in the case of an asymmetric structure, the above-described effects of the present invention may be obtained.

The compound represented by Chemical Formula 2 is preferably a compound represented by Chemical Formula 2a below.

[Chemical Formula 2a]

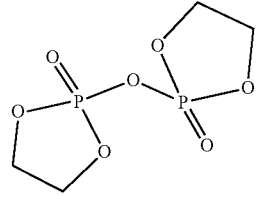

When the electrolyte additive is pyrophosphate having a symmetrical cyclic structure like the compound represented by Chemical Formula 2a, it is preferably because the stability of electron flow due to the symmetrical cyclic structure and stabilization effect due to simplification of the molecular structure are maximized. Accordingly, when the electrolyte additive is added to the electrolyte of a secondary battery, the charging resistance of the battery is reduced, thereby improving the output of the battery, increasing charging recovery capacity at high temperature, and increasing a lifespan. Thus, it is desirable to use the electrolyte additive as an electrolyte additive for batteries.

Based on 100% by weight in total of the battery electrolyte, the electrolyte additive represented by Chemical Formula 2 may be included in an amount of 0.1 to 10% by weight, preferably 0.2 to 5% by weight, more preferably 0.4 to 2.0% by weight, most preferably 0.5 to 1.5% by weight. Within this range, the charging efficiency of the battery may be excellent, and a lifespan at high temperature may be greatly increased.

In addition, the present invention provides an electrolyte for batteries including the electrolyte additive of the present invention. The electrolyte is an electrolyte for non-aqueous lithium secondary batteries, and includes the electrolyte additive, an organic solvent, and a lithium salt.

For example, the organic solvent may be a carbonate-based organic solvent, and specifically, may be an organic solvent including one or more selected from the group consisting of ethylene carbonate (EC), diethyl carbonate (DEC), ethylmethyl carbonate (EMC), dimethyl carbonate (DMC), propylene carbonate (PC), dipropyl carbonate (DPC), butylene carbonate, methylpropyl carbonate, and ethylpropyl carbonate.

For example, the organic solvent may be one type of mixed solvent or two or more types of mixed solvents. Preferably, the organic solvent is a mixed solvent prepared by mixing an organic solvent having high ionic conductivity and high permittivity to increase battery charging/discharging performance and a low-viscosity organic solvent for adjusting the viscosity of a solvent to be suitable for a battery.

For example, as the organic solvent having high permittivity, EC, PC, or the like may be used. For example, as the low-viscosity organic solvent, EMC, DMC, DEC, or the like may be used. Preferably, the organic solvent having high permittivity and the low-viscosity organic solvent are mixed in a volume ratio of 2:8 to 8:2. More specifically, the organic solvent may be a ternary mixed solvent of EC or PC and EMC and DEC. In this case, the ratio of EC or PC and EMC and DEC may be 3:3 to 5:2 to 4.

When the organic solvent contains water, lithium ions in the electrolyte may be hydrolyzed. Accordingly, the amount of water in the organic solvent is preferably controlled to be 150 ppm or less, preferably 100 ppm or less.

As the lithium salt, any compound capable of providing lithium ions used in a lithium secondary battery may be used without particular limitation. Specifically, the lithium salt may include one or more selected from the group consisting of $LiPF_6$, $LiBF_4$, $LiCl$, $LiBr$, $LiI$, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, and $(CF_3S_2)_2NLi$, preferably $LiPF_6$.

When the lithium salt is dissolved in an electrolyte, the lithium salt may function as a source of lithium ions in a lithium secondary battery, and may promote movement of lithium ions between a cathode and an anode. Accordingly, the lithium salt is preferably included in the electrolyte at a concentration of about 0.6 mol % to 2 mol %. When the concentration of the lithium salt is less than 0.6 mol %, the conductivity of the electrolyte may be reduced, resulting in deterioration of electrolyte performance. When the concentration of the lithium salt exceeds 2 mol %, the viscosity of the electrolyte may be increased, causing decrease in the mobility of lithium ions. Considering the conductivity of the electrolyte and the mobility of lithium ions, the lithium salt is preferably included in the electrolyte at a concentration of 0.7 mol % to 1.6 mol %, more preferably 0.8 mol % to 1.5 mol %.

For example, in addition to the electrolyte additive represented by Chemical Formula 1, the electrolyte for batteries of the present invention may further include an additive (hereinafter referred to as "other additive") generally added to an electrolyte for the purpose of improving battery lifespan characteristics, suppressing battery capacity reduction, and improving battery discharge capacity.

As a preferred example, the other additive includes one or more selected from the group consisting of vinylene carbonate, fluoro ethylene carbonate, vinyl ethylene carbonate, ethyl propionate, propyl propionate, succinic anhydride, tetravinyl silane, hexamethylenetetramine, 1,1,2,2-tetrafluoroethyl 2,2,2-trifluoroethyl ether, 1,2-bis((difluorophosphaneyl)oxy)ethane, 1,3,6-hexanetricarbonitrile, succinonitrile, 1-ethyl-3-methylimidazolium dicyanamide, trimethoxyboroxine, lithium bis(oxaleto)borate, lithium difluro(oxalato) borate, tris(trimethylsilyl) borate, lithium tetrafluoroborate, triisopropyl borate, lithium tetrafluoro(oxalato) phosphate, lithium difluro(bisoxalato) phosphate, lithium difluorophosphate, diethyl (difluoromethyl)phosphonate, tris(trimethylsilyl) phosphite, tripropagyl phosphate, 2,4,8,10-tetraoxa-3,9-dithiaspiro[5.5]undecane 3,3,9,9-tetraoxide, dimethyl sulfate, ethylene dimethanesulfonate, methylene methyl disulfonate, lithium bis(fluorosulfonyl) imide, 3-fluoro-1,3-propansulton, ethylene sulfate, 1-propene-1,3-sultone, 1,3-propylene sulfate, 1,4-butane sultone, sulfolene, biphenyl, cyclo hexyl benzene, 4-fluorotoluene, triphenyl phosphate, fluoro benzene, and 2-fluoro-biphenyl. As another preferred example, the other additive includes a metal phosphate-based compound.

The metal phosphate-based compound may include one or more selected from the group consisting of lithium difluoro (bisoxalato) phosphate (LiDFOP), lithium tetrafluoro oxalato phosphate (LiTFOP), lithium difluorophosphate, and lithium trioxalato phosphate.

To improve the performance of a lithium secondary battery, a lithium ion capacitor, or the like, the metal phosphate-based compound may be included in an electrolyte at a concentration of 0.3 to 1.5% by weight, preferably 0.7 to 1.2% by weight. When the metal phosphate-based compound is included within this range, the low-temperature characteristics and cycle characteristics of a battery may be improved.

The other additives may share all description of the metal phosphate-based compound described as a representative example thereof.

The secondary battery of the present invention includes an anode, a cathode, a separator interposed between the anode and the cathode, and the electrolyte for batteries.

For example, the cathode may be prepared by mixing a cathode active material, a binder, and optionally, a conductive agent to obtain a composition for forming a cathode active material layer and applying the composition to a cathode current collector such as aluminum foil.

For example, as the cathode active material, lithium nickel manganese cobalt oxide (NCM, $LiNiMnCoO_2$) generally used in a lithium secondary battery may be used. Specifically, the cathode active material may be a lithium composite metal oxide represented by a chemical formula of Li $[Ni_xCo_{1-x-y}Mn_y]O_2$ ($0<x<0.5$, $0<y<0.5$), but the present invention is not limited thereto.

For example, in the chemical formula of $Li[Ni_xCo_{1-x-y}Mn_y]O_2$, variables x and y may satisfy the following ranges: $0.0001<x<0.5$ and $0.0001<y<0.5$, or $0.001<x<0.3$ and $0.001<y<0.3$.

As another example, as the cathode active material, a compound (lithiated intercalation compound) capable of reversible intercalation and deintercalation of lithium may be used.

Considering the capacity characteristics and stability of a battery, one or more selected from the group consisting of LiCoO$_2$, LiMnO$_2$, LiMn$_2$O$_4$, LiNiO$_2$, LiNi$_x$Mn$_{(1-x)}$O$_2$ (0<x<1), and LiM1$_x$M2$_y$O$_2$ (0≤x≤1, 0≤y≤1, 0≤x+y≤1, and M1 and M2 are each independently any one selected from the group consisting of Al, Sr, Mg, and La) may be used as the compound.

For example, the anode may be prepared by mixing an anode active material, a binder, and optionally, a conductive agent to obtain a composition for forming an anode active material layer and applying the composition to an anode current collector such as copper foil.

For example, as the anode active material, a compound capable of reversible intercalation and deintercalation of lithium may be used.

As a specific example, the anode active material may be a carbonaceous material such as artificial graphite, natural graphite, graphitized carbon fiber, and amorphous carbon. In addition, in addition to the carbonaceous material, a metal compound capable of alloying with lithium or a composite including a metal compound and a carbonaceous material may be used as the anode active material. For example, graphite may be used.

For example, the metal compound capable of alloying with lithium may include any one of Si, Al, Sn, Pb, Zn, Bi, In, Mg, Ga, Cd, an Si alloy, an Sn alloy, and an Al alloy.

In addition, a metal lithium thin film may be used as the anode active material. As the anode active material, at least one selected from the group consisting of crystalline carbon, amorphous carbon, carbon composites, lithium metals, and alloys including lithium, which have high stability, may be used.

To improve the performance of conventional batteries, in addition to the metal phosphate-based compound added to an electrolyte, by adding the electrolyte additive represented by Chemical Formula 1, compared to a conventional case of adding only an electrolyte additive, the secondary battery of the present invention has an effect of further improving battery characteristics, such as battery charging resistance measured by a hybrid pulse power characterization (HPPC) method, output characteristics, capacity recovery characteristics at a high temperature of 45° C. or higher, and lifespan characteristics. Specifically, the secondary battery of the present invention may have an HPPC charging resistance value of 500 mΩ or less, preferably 200 mΩ or less, more preferably 90 mΩ or less, most preferably 80 mΩ or less as measured at 60° C. In addition, the secondary battery may have a recovery capacity of 580 mAh or more, preferably 600 mAh or more, still more preferably 630 mAh or more as measured at 45° C. The secondary battery may have a lifespan maintenance efficiency of 80% or more, preferably 83% or more, more preferably 85% or more as measured at 45° C.

In this description, the HPPC charging resistance value may be measured using a method specified in the document "Battery test manual for plug-in hybrid electric vehicles (2010, Department of Energy, Idaho National Laboratory for the U.S.)", and is an important index indicating the output characteristics of a battery. In addition, the charging resistance may be expressed as a resistance value measured when a battery is charged. As charging resistance decreases, energy loss decreases. Thus, when charging resistance decreases, charging speed may be increased, and the output of a battery may be improved. Since the secondary battery of the present invention has a low HPPC charging resistance value, the secondary battery has a high charging speed and a high output, and thus is suitable for use as a battery for vehicles.

In this description, the recovery capacity refers to the capacity retention characteristics of a battery that has been left unattended for a long period of time. Specifically, when the recovery capacity is determined, discharged electric capacity when a battery left for a long time is discharged to a final discharge voltage and discharged electric capacity when the discharged battery is recharged and discharged again to the final discharge voltage are measured, and the two capacity values are compared. As recovery capacity increases, the amount of natural discharge due to battery preservation (storage) decreases. Thus, when recovery capacity is high, long-term storage of a battery is possible. In particular, as the storage temperature of a battery increases, natural discharge rate increases. Thus, recovery capacity at high temperature is a very important characteristic of a battery for vehicles. When the electrolyte additive of the present invention is added to an electrolyte for batteries, compared to a case of using only a conventional additive, recovery capacity is increased by 5 to 15%. Thus, with a single charge, the electrolyte may be stored for a long time.

Therefore, when the battery of the present invention is used as a battery for vehicles, vehicle size-dependent output and performance at low and high temperatures according to weather change or exposure to sunlight while driving or parking may be improved. Accordingly, the battery of the present invention may exhibit excellent performance as a battery for vehicles.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

SYNTHESIS EXAMPLE 1

Preparation of 1,3,2-dioxaphospholan-2-yl diethyl phosphite 2.38 g (17.2 mmol) of diethyl phosphite was placed in a dried 50 ml three-necked flask, and 5 ml of benzene was added thereto dropwise. While stirring, 1.75 g (17.2 mmol) of triethylamine was slowly added to the flask dropwise. While maintaining reaction temperature at 0° C., 2.18 g (17.2 mmol) of ethylene chlorophosphite was slowly added to the flask for 30 minutes dropwise. Thereafter, stirring was performed at 0° C. for 30 minutes, and the resulting triethylamine salt was filtered. The filtrate was vacuum distilled to obtain 2.1 g (yield: 55%) of 1,3,2-dioxaphosphorane-2-yl diethyl phosphite, which was a desired product. The structure of the obtained product was confirmed by 1H NMR as follows.

1H NMR (CDCl3, 400 MHz) δ=4.18 (m, 2H), 4.05 (m, 2H), 3.85 (m, 4H), 1.24 (m. 6H)

SYNTHESIS EXAMPLE 2

Preparation of 2-((trimethylsilyl)oxy)-1,3,2-dioxaphospholane 5 g (55.4 mmol) of trimethylsilanol was placed in a dried 100 ml three-necked flask, and 50 ml of diethyl ether as a solvent and 6.1 g (60.0 mmol) of triethylamine were added thereto dropwise. While maintaining reaction temperature at −10° C., 5.8 g (46.1 mmol) of 2-chloro-1,3,2-dioxaphosphorane was slowly added to the flask dropwise. Reaction was performed by stirring for 10 hours. At room temperature, triethylamine salt was removed by filtration. The filtrate was vacuum distilled to obtain 4.9 g (yield: 60%) of 2-((trimethylsilyl)oxy)-1,3,2-dioxaphosphorane, which was a desired product. The structure of the obtained product was confirmed by 1H NMR as follows.

1H NMR (CDCl3, 400 MHz) δ=4.12 (m, 2H), 3.92 (m, 2H), 0.18 (s. 9H)

EXAMPLE 1

When an electrolyte for batteries was prepared, a carbonate-based mixed solvent having a volume ratio of EC:EMC:CEC=3:4:3 was used as an organic solvent, and 0.5% by weight of an electrolyte additive represented by Chemical Formula 2a below was added to a 1.15 M solution containing LiPF6 as a lithium salt.

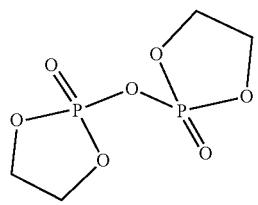

[Chemical Formula 2a]

(CAS number: 22063-07-6, Chemical name: bisethylene pyrophosphate)

EXAMPLE 2

When an electrolyte for batteries was prepared, a carbonate-based mixed solvent having a volume ratio of EC:EMC:CEC=3:4:3 was used as an organic solvent, and 1% by weight of LiDFOP and 0.5% by weight of the electrolyte additive represented by Chemical Formula 2a were added to a 1.15 M solution containing $LiPF_6$ as a lithium salt.

EXAMPLE 3

The same procedure as in Example 2 was performed, except that 0.3% by weight of the electrolyte additive was used.

EXAMPLE 4

The same procedure as in Example 2 was performed, except that 0.8% by weight of the electrolyte additive was used.

EXAMPLE 5

The same procedure as in Example 2 was performed, except that 1.0% by weight of the electrolyte additive was used.

EXAMPLE 6

The same procedure as in Example 2 was performed, except that 2.0% by weight of the electrolyte additive was used.

EXAMPLES 7 to 8

The same procedure as in Example 1 was performed, except that the electrolyte additive of Example 1 was replaced by a compound of Synthesis Example 1 represented by Chemical Formula 16, and 0.5% by weight (Example 7) and 1% by weight (Example 8) of the compound were used.

EXAMPLES 9 to 10

The same procedure as in Example 1 was performed, except that the electrolyte additive of Example 1 was replaced by a compound of Synthesis Example 2 represented by Chemical Formula 25, and 0.5% by weight (Example 9) and 1% by weight (Example 10) of the compound were used.

COMPARATIVE EXAMPLE 1

The same procedure as in Example 2 was performed, except that the electrolyte additive of Example 2 represented by Chemical Formula 2a was not used.

COMPARATIVE EXAMPLE 2

The same procedure as in Example 1 was performed, except that the electrolyte additive of Example 1 represented by Chemical Formula 2a was replaced by cyclic ethylene phosphate (CAS number: 6711-47-3) having an asymmetric structure, and 0.5% by weight of cyclic ethylene phosphate was added.

Preparation of battery 92% by weight of $Li(Ni_{0.5}Co_{0.2}Mn_{0.3})O_2$ as a cathode active material, 4% by weight of carbon black as a conductive agent, and 4% by weight of polyvinylidene fluoride (PVdF) as a binder were added to N-methyl-2-pyrrolidone (NMP) as a solvent to prepare a cathode mixture slurry. The cathode mixture slurry was applied to an aluminum (Al) thin film that was a cathode current collector having a thickness of about 20 μm, followed by drying and roll pressing to prepare a cathode.

96% by weight of carbon powder as an anode active material, 3% by weight of PVdF as a binder, and 1% by weight of carbon black as a conductive agent were added to NMP as a solvent to prepare an anode mixture slurry. The anode mixture slurry was applied to a copper (Cu) thin film that was an anode current collector having a thickness of about 10 μm, followed by drying and roll pressing to prepare an anode.

A pouch-type battery was manufactured in a conventional manner using the prepared cathode and anode and a separator consisting of three layers of polypropylene/polyethylene/polypropylene (PP/PE/PP), and then the electrolytes prepared in Examples 1 to 10 and Comparative Examples 1 and 2 were injected thereto to manufacture a lithium secondary battery.

Test Examples

The performance of the prepared secondary batteries was evaluated according to the following methods, and the results are shown in Table 1 below.

[Evaluation of HPPC Charging Resistance]

HPPC charging resistance was measured using a method specified in the document "Battery test manual for plug-in hybrid electric vehicles (2010, Department of Energy, Idaho National Laboratory for the U.S.)".

A voltage value, a charge/discharge current value corresponding to C-rate, degree of current change (ΔI), degree of change in discharge voltage (ΔV), degree of change in charge voltage (ΔV), discharging resistance, and charging resistance were measured at high temperature (60° C.). A resistance value was calculated using a slope value obtained from the degree of change in current and voltage by briefly flowing charge/discharge current for each C-rate for a certain period of time.

times under the same charging and discharging conditions, and the average value of the measured values was calculated.

[Evaluation of High Temperature Lifespan]

The secondary batteries were charged with a current of 1 C rate at 45° C. in a constant current mode until voltage reached 4.20 V (vs. Li), and then cut-off was performed at a current of 0.05 C rate while maintaining 4.20 V in a constant voltage mode. Then, the secondary batteries were discharged at a constant current of 1 C rate until voltage reached 3.0 V (vs. Li) (1st cycle). The cycle was repeated 300 times, and the average value of the measured values was calculated.

TABLE 1

| Classification | Additives (% by weight) | | HPPC charging resistance (mΩ) | High-temperature recovery capacity (mAh) | High-temperature lifespan efficiency (%) |
|---|---|---|---|---|---|
| Example 1 | Chemical Formula 2a (0.5) | — | 51.1 | 663.3 | 88.3 |
| Example 2 | Chemical Formula 2a (0.5) | LiDFOP (1.0) | 52.1 | 661.1 | 88.5 |
| Example 3 | Chemical Formula 2a (0.3) | LiDFOP (1.0) | 51.8 | 666.3 | 88.1 |
| Example 4 | Chemical Formula 2a (0.8) | LiDFOP (1.0) | 51.3 | 659.6 | 88.8 |
| Example 5 | Chemical Formula 2a (1.0) | LiDFOP (1.0) | 52.8 | 656.5 | 87.9 |
| Example 6 | Chemical Formula 2a (2.0) | LiDFOP (1.0) | 52.1 | 661.8 | 88.1 |
| Example 7 | Chemical Formula 16 (0.5) | | 50.0 | 685.5 | 89.0 |
| Example 8 | Chemical Formula 16 (1.0) | | 48.0 | 683.1 | 90.0 |
| Example 9 | Chemical Formula 25 (0.5) | | 48.2 | 693.2 | 90.0 |
| Example 10 | Chemical Formula 25 (1.0) | | 46.0 | 696.5 | 91.0 |
| Comparative Example 1 | — | LiDFOP (1.0) | 113.7 | 598.1 | 71.2 |
| Comparative Example 2 | Cyclic ethylene phosphate (0.5) | — | 98.3 | 601.1 | 75.4 |

[Evaluation of High-Temperature Recovery Capacity]

As charging conditions, charging was performed at a constant current of 1.0 C and a voltage of 4.2 V until charging current reaches 1/10 C. As discharging conditions, charging and discharging were performed by discharging up to 3.0 V at a constant current of 1.0 C, and then discharge capacity was measured.

After charging under the same charging and discharging conditions, the secondary batteries were stored in a constant temperature bath at 60° C. for 4 weeks. Then, the secondary batteries were discharged to a discharge voltage of 3 V at a high temperature of 60° C., and the residual capacity was measured. Thereafter, the above process was repeated three As shown in Table 1, the secondary battery using the electrolyte additive of the present invention exhibited a charging resistance value of 51.1 to 52.8 mΩ. In contrast, in the case of Comparative Example 1 using only LiDFOP as a conventional electrolyte additive, a high charging resistance value was observed, showing a charging resistance value of 113.7 mΩ. In the case of Comparative Example 2 using only cyclic ethylene phosphate, which was an asymmetric phosphate, a high charging resistance value was observed, showing a charging resistance value of 98.3 mΩ. It was confirmed that the charging resistance value was reduced by up to 45% by using the electrolyte additive of the present invention. Accordingly, these results indicated that the output of the battery was improved by the electrolyte additive of the present invention.

In addition, as shown in Table 1, the secondary battery using the electrolyte additive of the present invention exhibited a high-temperature recovery capacity of 656.5 to 696.5 mAh. In contrast, Comparative Examples 1 and 2 exhibited a high-temperature recovery capacity of 598.1 and 601.1 mAh. That is, the high-temperature recovery capacity of Comparative Examples 1 and 2 was less than that of the example of the present invention, showing a difference of up to 98.4 mAh. These results showed that recovery capacity at a high temperature of 45° C. could be improved by using the electrolyte additive of the present invention. Accordingly, it was confirmed that the recovery capacity of a battery during long-term storage at high temperature was improved by the electrolyte additive of the present invention.

In addition, as a result of high-temperature lifespan efficiency evaluation, the secondary battery using the electrolyte additive of the present invention exhibited a high-temperature lifespan efficiency of 87.9 to 91.0%. In contrast, Comparative Examples 1 and 2 exhibited a high-temperature lifespan efficiency of 71.2% and 75.4%, which was at most 19.8% point lower than that of the example of the present invention. That is, compared to the case of using only the conventional electrolyte additive, by using the electrolyte additive of the present invention, the capacity retention of a battery was improved when the cycle was repeated 300 times at a high temperature. Accordingly, it can be seen that the cycle characteristics and lifespan efficiency of a battery may be improved in a high-temperature environment by using the electrolyte additive of the present invention.

Therefore, when the electrolyte additive according to embodiments of the present invention and the electrolyte including the electrolyte additive are applied to a secondary battery, charging resistance, output, recovery capacity, and lifespan efficiency are improved, and thus the secondary battery of the present invention is suitable for use as the secondary battery for vehicles.

The invention claimed is:
1. An electrolyte additive, comprising a compound represented by one selected from the group consisting of Chemical Formulas 2 to 15 and 17 to 24 below:

[Chemical Formula 2]

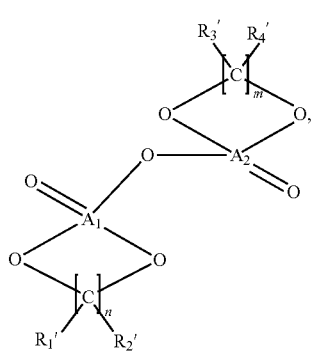

in chemical Formula 2, $A_1$ and $A_2$ are each independently phosphorus or sulfur; $R_1'$, $R_2'$ $R_3'$, and $R_4'$ are each independently hydrogen, or an alkyl group having 1 to 10 carbon atoms; and m and n are each independently an integer of 1 to 5,

[Chemical Formula 3]

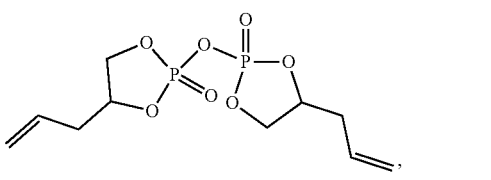

[Chemical Formula 4]

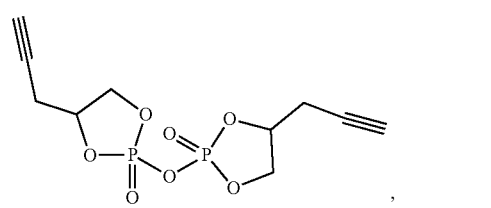

[Chemical Formula 5]

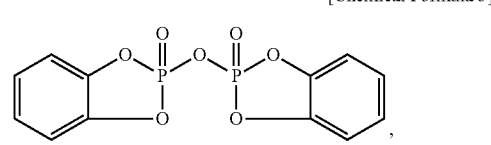

[Chemical Formula 6]

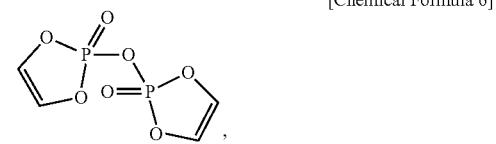

[Chemical Formula 7]

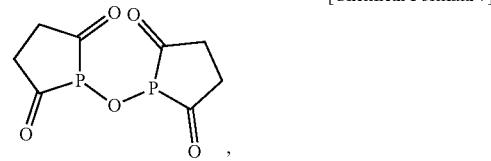

[Chemical Formula 8]

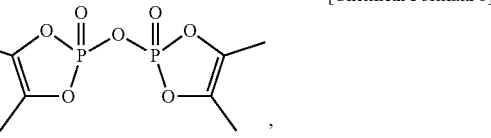

[Chemical Formula 9]

[Chemical Formula 10]

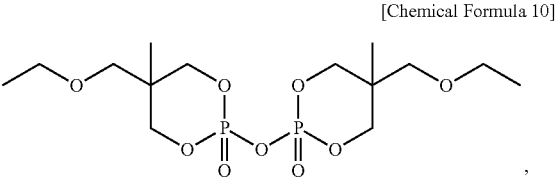

[Chemical Formula 11]

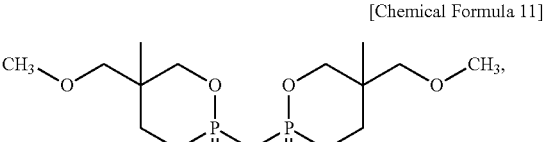

[Chemical Formula 12]

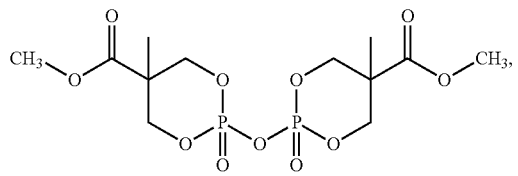

[Chemical Formula 13]

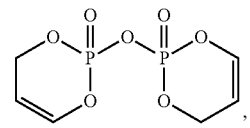

[Chemical Formula 14]

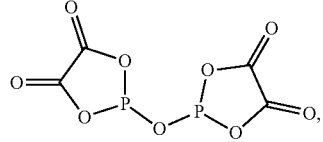

[Chemical Formula 15]

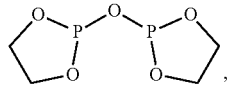

[Chemical Formula 17]

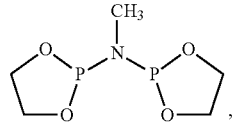

[Chemical Formula 18]

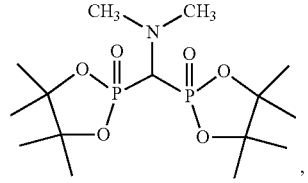

[Chemical Formula 19]

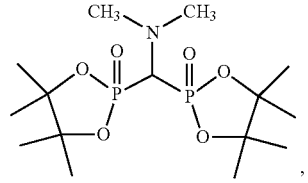

[Chemical Formula 20]

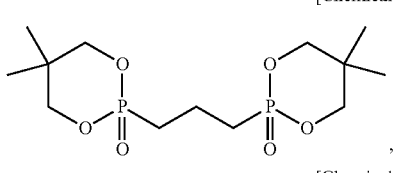

[Chemical Formula 21]

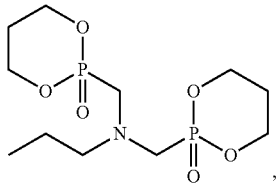

[Chemical Formula 22]

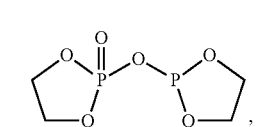

[Chemical Formula 23]

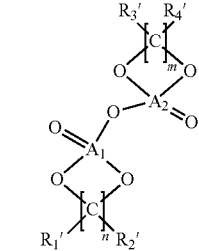

, and

[Chemical Formula 24]

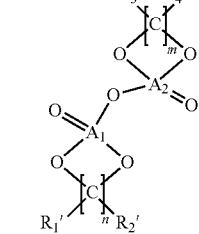

wherein, in Chemical Formulas 3 to 15 and 17 to 24, a line denotes a bond, a point where the lines meet without any element being marked denotes carbon, and hydrogens satisfying a valence of the carbon are omitted.

2. An electrolyte for batteries, comprising an organic solvent, a lithium salt, and an electrolyte additive, wherein the electrolyte additive comprises a compound represented by one selected from the group consisting of Chemical Formulas 2 to 15 and 17 to 24 below:

[Chemical Formula 2]

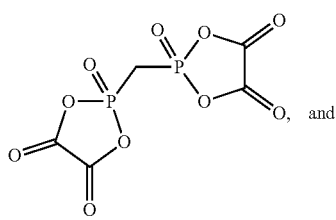

in chemical Formula 2, $A_1$ and $A_2$ are each independently phosphorus or sulfur; $R_1'$, $R_2'$, $R_3'$, and $R_4'$ are each independently hydrogen, or an alkyl group having 1 to 10 carbon atoms; and m and n are each independently an integer of 1 to 5,

[Chemical Formula 3]

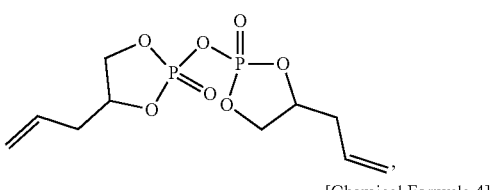

[Chemical Formula 4]

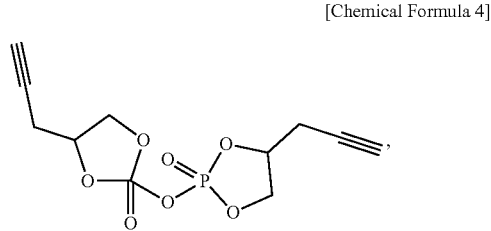

[Chemical Formula 5]
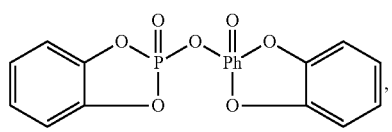

[Chemical Formula 6]
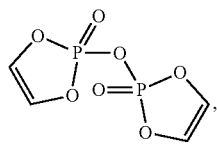

[Chemical Formula 7]
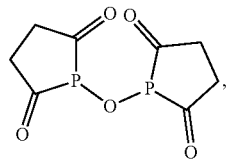

[Chemical Formula 8]
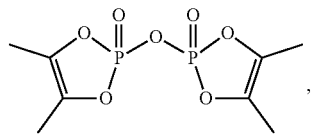

[Chemical Formula 9]
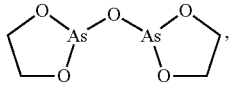

[Chemical Formula 10]
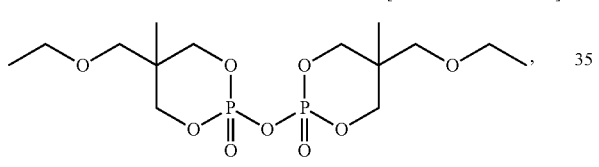

[Chemical Formula 11]
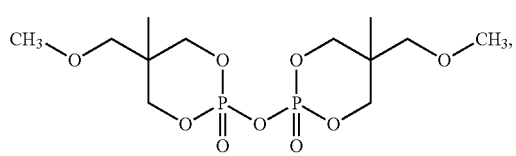

[Chemical Formula 12]
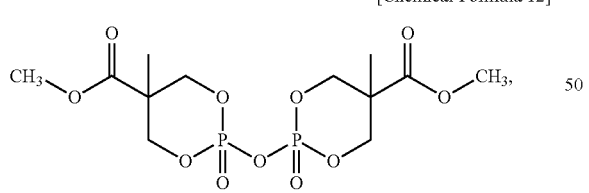

[Chemical Formula 13]
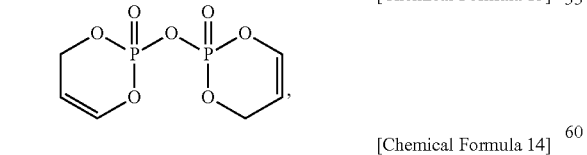

[Chemical Formula 14]
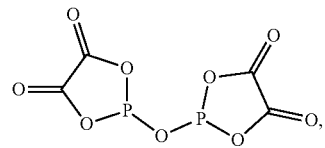

[Chemical Formula 15]
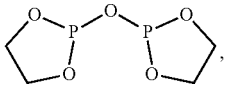

[Chemical Formula 17]
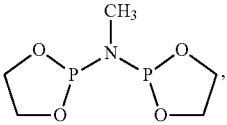

[Chemical Formula 18]
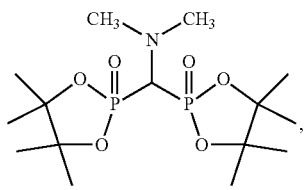

[Chemical Formula 19]
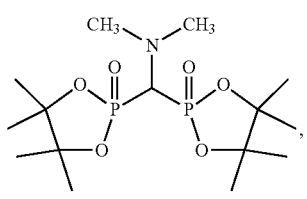

[Chemical Formula 20]
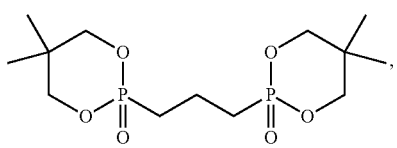

[Chemical Formula 21]
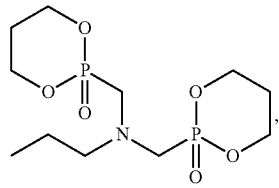

[Chemical Formula 22]
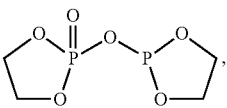

[Chemical Formula 23]
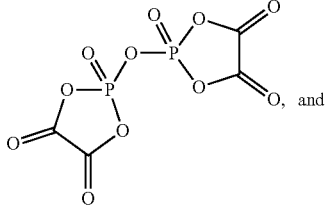

, and

[Chemical Formula 24]
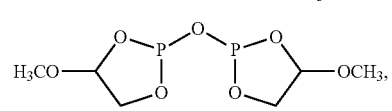

wherein, in Chemical Formulas 3 to 15, and 17 to 24, a line denotes a bond, a point where the lines meet without any element being marked denotes carbon, and hydrogens satisfying a valence of the carbon are omitted.

3. The electrolyte according to claim 2, wherein, based on 100% by weight in total of the electrolyte, the compound represented by Chemical Formula 1 is comprised in an amount of 0.1 to 10% by weight.

4. The electrolyte according to claim 2, wherein the compound represented by Chemical Formula 1 has a symmetric structure by satisfying "m=n".

5. The electrolyte according to claim 2, wherein the organic solvent comprises one or more selected from the group consisting of ethylene carbonate (EC), diethyl carbonate (DEC), ethylmethyl carbonate (EMC), dimethyl carbonate (DMC), propylene carbonate (PC), dipropyl carbonate (DPC), butylene carbonate, methylpropyl carbonate, and ethylpropyl carbonate.

6. The electrolyte according to claim 2, wherein the lithium salt comprises one or more selected from the group consisting of $LiPF_6$, $LiF_4$, $LiCl$, $LiBr$, $LiI$, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, and $(CF_3SO_2)_2NLi$.

7. The electrolyte according to claim 2, wherein the electrolyte comprises a metal phosphate-based compound.

8. The electrolyte according to claim 7, wherein the metal phosphate-based compound comprises one or more selected from the group consisting of lithium difluoro (bisoxalato) phosphate, lithium tetrafluoro oxalato phosphate, lithium difluorophosphate, and lithium trioxalato phosphate.

9. A secondary battery, comprising an anode, a cathode, a separator interposed between the anode and the cathode, and an electrolyte,
wherein the electrolyte is the electrolyte according to claim 2.

10. The secondary battery according to claim 9, wherein the secondary battery has an HPPC charging resistance value of 500 mΩ or less at 25° C.

11. The secondary battery according to claim 9, wherein the secondary battery has a recovery capacity of 580 mAh or more at 45° C.

12. The secondary battery according to claim 9, wherein the secondary battery has a lifespan maintenance efficiency of 80% or more at 45° C.

13. The secondary battery according to claim 9, wherein the secondary battery is a battery for vehicles.

* * * * *